US005417944A

United States Patent [19]

Husian

[11] Patent Number: 5,417,944

[45] Date of Patent: May 23, 1995

[54] CENTRIFUGE PROCESS TO SEPARATE THE ISOTOPES OF URANIUM HEXAFLUORIDE

[76] Inventor: Mohammad Q. Husian, 258/3 Bahadurabad Housing Society Road-14, Karachi-5, Pakistan

[21] Appl. No.: 18,039

[22] Filed: Feb. 24, 1987

Related U.S. Application Data

[63] Continuation-in-part of Ser. No. 362,986, Mar. 29, 1982, abandoned.

[51] Int. Cl.$^{6}$ .............................................. C01G 56/00

[52] U.S. Cl. .......................................... 423/3; 494/37; 55/17

[58] Field of Search ................... 423/3; 55/17; 494/37

[56] References Cited

U.S. PATENT DOCUMENTS

| | | | |
|---|---|---|---|
| 2,422,882 | 6/1947 | Bramley | 494/37 |
| 3,902,658 | 9/1975 | Madsen | 423/3 X |
| 4,290,781 | 9/1981 | Wang | 55/17 |
| 4,294,598 | 10/1981 | Gazda | 55/403 |

OTHER PUBLICATIONS

D. Aston, "The Evolution of Liquid and Gas Centrifuges", in *Endeavour,* vol. 2(3), 1978, pp. 142–148.

*Primary Examiner*—Donald P. Walsh

*Attorney, Agent, or Firm*—Kane, Dalsimer, Sullivan, Kurucz, Levy, Eisele and Richard

[57] ABSTRACT

A method comprises revolving liquid $UF_6$ in a swinging bucket rotor or a fixed angle rotor of an ultra centrifuge with a peripheral velocity of 300 m/s or above and at a speed of 40,000 to 65,000 rpm or above, providing force from 240,660 g to 485,000 g or above. The method yields a separation of the $U^{235}F_6$ and $U^{238}F_6$ isotopes.

6 Claims, 1 Drawing Sheet

FIG.1
FIG.2
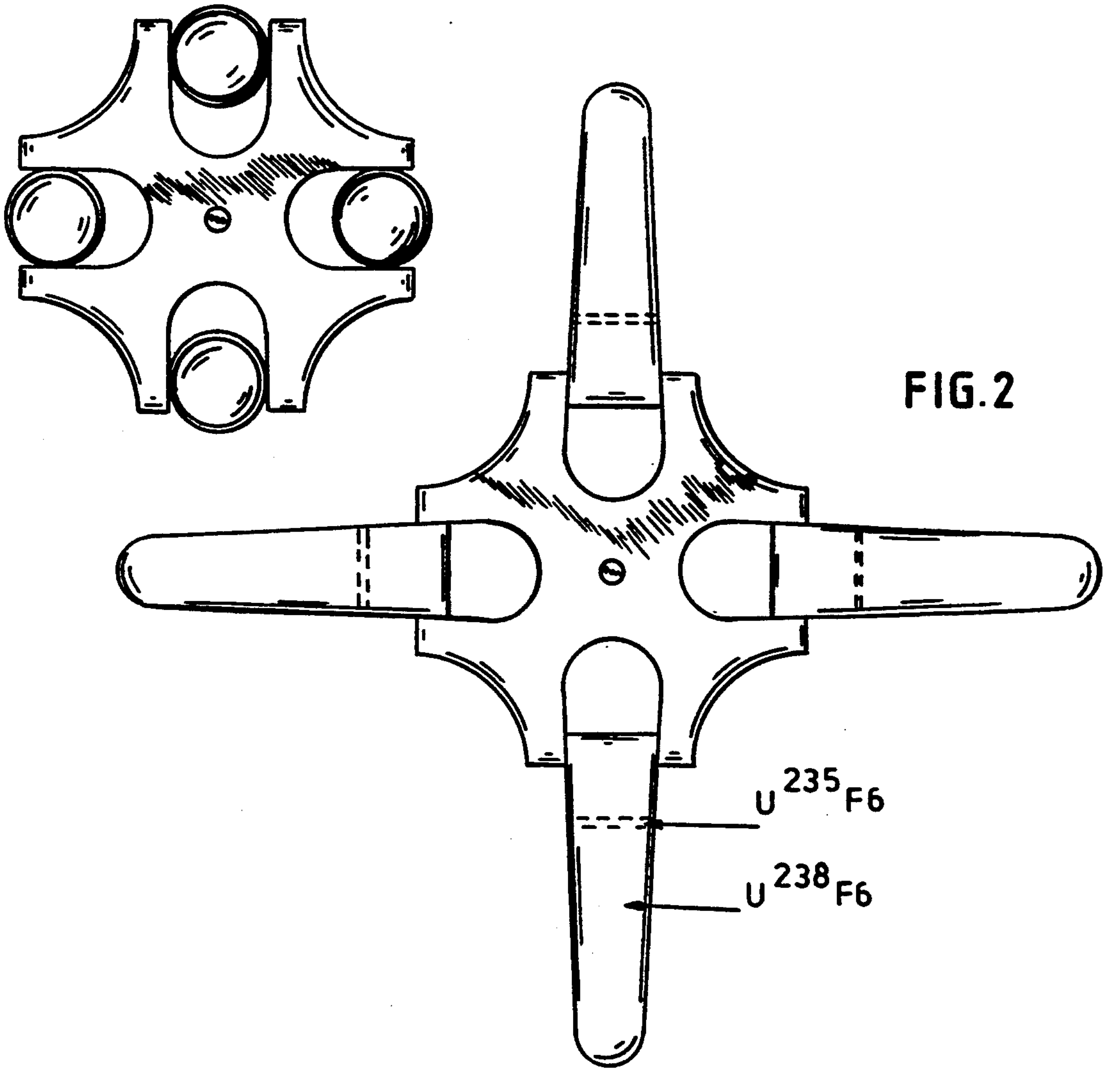
FIG.3
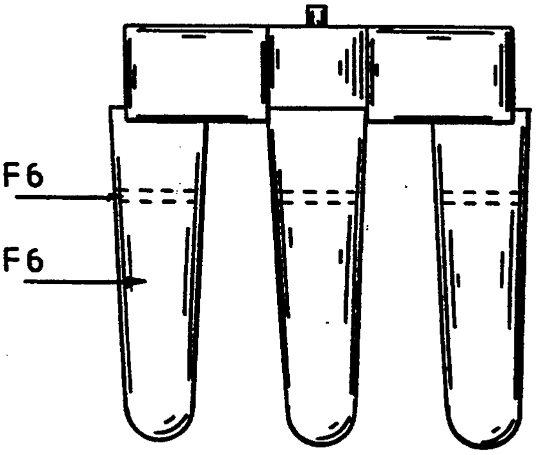

CENTRIFUGE PROCESS TO SEPARATE THE ISOTOPES OF URANIUM HEXAFLUORIDE

CROSS-REFERENCE TO RELATED APPLICATION

This application is a continuation-in-part of U.S. patent application Ser. No. 362,986 filed Mar. 29, 1982 appealed then abandoned before decision.

BACKGROUND OF THE INVENTION

1. Field of the Invention

This invention relates to the field of isotope separation. More particularly the invention concerns the separation of $U^{235}$ from $U^{238}$ by centrifugation.

2. Brief Description of the Prior Art

Uranium isotopes have been separated using the following types of centrifuge:

1. Concurrent Centrifuge
2. Counter-current Centrifuge
3. Evaporative Centrifuge The Concurrent Centrifuge is an application to gaseous flow of the continuous cream separator. As originally conceived, a single stream of gas (this will be vapor of $UF_6$ if separating $U^{235}$ from $U^{238}$) enters one end of a rotor through a hollow shaft and two streams are taken off the other end, one from the periphery and one near the axis.

The Counter Current Centrifuge is made tall and narrow, circulation being established by continuous vaporization of liquid $UF_6$ from the bottom cap of the rotor with condensation in the top cap of the rotor. The condensed liquid is forced out to the periphery and flows down the walls, counter current to the vapor flow. As the liquid passes down the centrifuge, there is a concentration of the heavy isotope in the liquid phase.

In the Evaporative Centrifuge, a small amount of liquid $UF_6$ is introduced into the centrifuge forming a layer at the periphery. During the spinning of the rotor, vapor is removed slowly through a shaft along the axis. Since the vapor comes from the inside surface of the liquid, it is enriched in the lighter isotope $U^{235}F_6$.

In all the prior art methods, many stages are required to obtain appreciable separation of the isotopes.

In contrast to the prior art methods, the process of the invention produces isotopic separation throughout a liquid phase to obtain complete separation of $U^{235}F_6$ in a single stage with a purity of 100%.

SUMMARY OF THE INVENTION

The invention comprises the discovery that the difference of forces exerted on $U^{235}F_6$ and $U^{238}F_6$ by a gravity centrifuge is greater than the attraction between the unlike molecules in the liquid phase. Hence if the liquid $UF_6$ is revolved at high speed, it resolves into its components.

It has been observed from experiments that in a gravity centrifuge rotor of cylindrical shape, separated $U^{235}F_6$ and $U^{238}F_6$ are remixed if the rotor is brought to rest after the separation. However, a solution to this problem has been found in the use of a specific type of ultracentrifuge rotor of characteristic shape as illustrated in the figures of the accompanying drawings. If this particular rotor is used, when brought to rest the $U^{235}F_6$ after being separated does not remix with $U^{238}F_6$.

It was also found that $U^{235}F_6$ after being separated continues to float on the surface of $U^{238}F_6$, permitting the former to be taken away in the liquid phase from the surface of $U^{238}F_6$. Advantageously the centrifuge rotor spins in a vacuum chamber, to eliminate frictional heating and convection currents and also to eliminate vibration, thereby permitting separation of the uranium isotopes.

Pure $U^{235}F_6$ may be produced, with the aid of an ultra centrifuge, having the following performance features:

| Type of Rotor | Speed rev/min | Max. Force | Operating Temperature | Rotor Chamber Vacuum |
|---|---|---|---|---|
| Swinging Bucket Rotor | 65,000 | 485,00, g. | 0–70° C. | Below 5 microns |

The separated $U^{235}F_6$ may be converted to the metallic form of $U^{235}$ by conventional and known techniques.

BRIEF DESCRIPTION OF THE DRAWING

FIG. 1 is a plan view of a centrifuge used in the method of the invention, as seen from above.

FIG. 2 is a plan view of the centrifuge seen in FIG. 1 while revolving and containing $U^{235}F_6$ and $U^{238}F_6$.

FIG. 3 is a front view of the centrifuge shown in FIG. 2, but at rest.

DETAILED DESCRIPTION OF THE PREFERRED EMBODIMENTS OF THE INVENTION

The discovery underlying the invention is that $U^{235}F_6$ and $U^{238}F_6$ are immiscible in the liquid state. Thus, liquid $UF_6$ can be resolved by a gravity centrifuge into its components of $U^{235}F_6$ and $U^{238}F_6$.

In the method of the invention, uranium hexafluoride is first melted. The liquid $UF_6$ is introduced into either a swinging bucket rotor or a fixed angle rotor of an ultra-centrifuge. The swinging bucket rotor is illustrated in FIGS. 1–3 of the accompanying drawing. The rotor is revolved with a peripheral velocity of 300 m/s or above at any speed from 40,000 to 650,000 rpm or above, providing a force of from 240,660 to 485,000 g or above. The heavier component $U^{238}F_6$ tends to migrate toward the periphery while the lighter component $U^{235}F_6$ moves toward the surface. Complete separation can be achieved if centrifugation is allowed to continue until all the molecules of $U^{235}F_6$ are collected on the surface of $U^{238}F_6$, as shown in FIG. 2 The $U^{235}F_6$ does not remix with $U^{238}F_6$ when the rotor is brought to a standstill in equilibrium, because of the type of rotor employed. Even after the rotor is stopped, $U^{235}F_6$ continues to float on the liquid surface of $U^{238}F_6$ as shown in FIG. 3 until the former is taken away as a liquid from the surface, using any known separation technique.

In a preferred procedure, $UF_6$ is heated until the vapor pressure reaches 1137 mm of Hg and the temperature is 64° C. The $UF_6$ will be melted to obtain a liquid state.

Establishing the running temperature of the centrifuge rotor chamber at 66° C., the liquid $UF_6$ is introduced into a swinging bucket rotor or a fixed angle rotor of the ultra-centrifuge. The ultra-centrifuge selected is one which can drive the rotor at a speed up to 65,000 rpm. The swinging bucket rotor provides a force up to 485,000 g, and a total volume of 26.4 ml. Preferably the ultra-centrifuge has a fully instrumented control unit which automatically carries out preset speed, temperature, run-time, acceleration and braking instructions. Advantageously the rotor is accelerated to 65,000 rpm in about 8 minutes.

Advantageously, nickel-plated process equipment and piping are used to handle the uranium hexafluoride. Standard precautions should be taken to avoid breathing vapours of $UF_6$, since it is hazardous.

Apparatus for carrying out the process of the invention is conventional and commercially available. One such ultra-centrifuge is the Beckman Model L5-65 with a swing bucket type of rotor (SW-60). Another ultra-centrifuge is the Hitachi Automatic Preparative Ultracentrifuge (Models SCP85H and SCP70H) fitted with a swing rotor such as the Hitachi RPS65T.

As will be appreciated by those skilled in the art, the principal causes of remixing of liquid in a tube subjected to centrifugation are thermal gradients, changes in rotor speed and inertia of the liquid under deceleration. The Hitachi ultracentrifuge is protected against effects from such causes both by design and by various devices. As described in the Hitachi Ultracentrifuges Manual, the use of vacuum prevents air friction on the rotor which would cause convection currents. The rotor chamber is, therefore, equipped with an evacuating system that serves to eliminate convection currents and also vibration, thereby permitting successful separation of uranium isotopes. The control unit serves to stabilize the speed of the rotor throughout operation and the brake to decelerate the rotor is automatically released to bring the rotor smoothly to rest with no remixing of the separated material.

The following examples describe the manner and the process of carrying out the invention and set forth the best mode contemplated by the inventor for carrying out the invention but are not to be construed as limiting.

EXAMPLE 1

A Beckman Model L5-65 ultra-centrifuge with a swinging bucket rotor (SW-60) as illustrated in FIGS. 1–3 is provided. Liquid $UF_6$ is introduced into the rotor of the centrifuge. The liquid is revolved with a peripheral velocity of 300 m/s or above at any speed of from 40,000 to 65,000 rpm or above. Under these conditions the lighter liquid ($U^{235}F_6$) floats on the heavier one ($U^{238}F_6$). There is no diffusion across the interface separating the two liquid layers. The lighter liquid continues to float on the heavier one, even when the centrifuge is brought to a standstill.

EXAMPLE 2

A Beckman Model L5-65 ultra-centrifuge fitted with a swing rotor (SW-60Ti) is provided.

Using the above-described ultracentrifuge, a separation of liquid state uranium hexafluoride was carried out to obtain the separate $U^{235}F_6$ and $U^{238}F_6$ isotopes by the following procedure:

1. converting natural uranium into liquid uranium hexafluoride (a complete mixture of $U^{235}F_6$ and $U^{238}F_6$);
2. introducing 100 grams of the liquid into the swinging bucket rotor;
3. setting the rotor in position;
4. turning on both the vacuum pump and the diffusion pump to pull full vacuum;
5. presetting the run temperature at 70° C.;
6. setting the speed at 60,000 rpm. The ultracentrifuge generates centrifugal force of 485,000 g at this speed;
7. accelerating the rotor to 60,000 rpm in 8 minutes and centrifuging until complete separation of $U^{235}F_6$ had been achieved;
8. the braking system brought the rotor smoothly to rest with no remixing of separated $U^{235}F_6$. Even after it was stopped, $U^{235}F_6$;
9. turning Off vacuum and removing rotor;
10. taking away $U^{235}F_6$ in the upper liquid layer.

A second run Was made, introducing 33 gms of $UF_6$ into the rotor.

The runs as described above were carried out to separate the isotopes of $UF_6$. The result is tabulated below:

| Starting Amounts of Components in the Complete Mixture | | | Amounts of Components After Separation | | | Yield of Product |
|---|---|---|---|---|---|---|
| $UF_6$ (gm) | $U^{235}F_6$ gm | $U^{238}F_6$ gm | In the Floating Layer | In the Lower Layer | The Width of Floating Layer | Product Isotopes |
| 100 | 0.71 | 99.29 | (leaving the wastage) 0.664 gms of $U^{235}F_6$ with a purity up to almost 100% | 99.336 gms of $U^{238}F_6$ | (approximate) 0.02 cm | 0.45 gms of $U^{235}$ |
| 33 | 0.235 | 32.766 | 0.20 gm of $U^{235}F_6$ with a purity up to almost 100% | 32.79 gm of $U^{238}F_6$ 32.79 gm of $U^{235}F_6$ | 0.008 cm | 0.14 gm of $U^{235}$ |

Notable is the fact that the method gives a complete separation of $U^{235}F_6$ with a purity of almost 100 percent in a single stage. In, contrast, the gaseous diffusion process of the prior art requires several thousand stages to effect separation of $U^{235}F_6$ with a purity of only 99 percent. The process of the invention is a far more simple and economical one in comparison with the prior art process of gaseous diffusion.

What is claimed is:

1. A process for the separation of $U^{235}F_6$, which consists essentially of;
   - providing a liquid uranium hexafluoride mixture of $U^{235}F_6$ and $U^{238}F_6$ isotopes;
   - charging the liquid in a swinging bucket rotor or a fixed angled rotor of a centrifuge;
   - subjecting the charged liquid to a centrifugal force sufficient to overcome the molecular force between $U^{238}F_6$ and $U^{235}F_6$ and whereby the $U^{235}F_6$ is separated from the $U^{238}F_6$ in a liquid layer; and
   - separating the layer.

2. The process of claim 1 wherein the centrifugal force employed is from 240,600 g to 480,000 g.

3. A process of claim 1, carried out in a single stage and in a single centrifuge.

4. A process of claim 1 wherein isotopic separation of $U^{235}F_6$ is produced throughout the process in the liquid phase.

5. A process for the preparation of $U^{235}$ from a mixture of $U^{235}F_6$ and $U^{238}F_6$, which comprises;

(a) providing the mixture in a liquid form;

(b) introducing the liquid into a swinging bucket rotor or a fixed angled rotor of a gravity centrifuge;

(c) establishing a vacuum in the chamber of the rotor containing the liquid;

(d) subjecting the liquid in the rotor to sufficient centrifugal force to separate the liquid into first and second liquid layers of pure $U^{235}F_6$ and $U^{238}F_6$ respectively;

(e) removing the first liquid layer from the second layer; and (f) converting the $U^{235}F_6$ in the separated first layer to the metallic form of $U^{235}$.

6. The process of claim 5, wherein complete separation of $U^{235}F_6$ is obtained in a single stage with purity up to 100%.

* * * * *